United States Patent
Strömberg et al.

(10) Patent No.: US 12,033,449 B2
(45) Date of Patent: Jul. 9, 2024

(54) MANAGING ADMINISTRATION PRIVILEGES OF AN ELECTRONIC LOCK

(71) Applicant: ASSA ABLOY AB, Stockholm (SE)

(72) Inventors: Stefan Strömberg, Stockholm (SE); Eric Thomsen, Bromma (SE); Poyan Daneshnejad, Nacka (SE); Sona Singh, Täby (SE)

(73) Assignee: ASSA ABLOY AB, Stockholm (SE)

( * ) Notice: Subject to any disclaimer, the term of this patent is extended or adjusted under 35 U.S.C. 154(b) by 911 days.

(21) Appl. No.: 16/982,943

(22) PCT Filed: Apr. 10, 2019

(86) PCT No.: PCT/EP2019/059144
§ 371 (c)(1),
(2) Date: Sep. 21, 2020

(87) PCT Pub. No.: WO2019/197491
PCT Pub. Date: Oct. 17, 2019

(65) Prior Publication Data
US 2021/0019970 A1 Jan. 21, 2021

(30) Foreign Application Priority Data
Apr. 11, 2018 (EP) .................... 18166786

(51) Int. Cl.
*G06F 21/35* (2013.01)
*G07C 9/00* (2020.01)

(52) U.S. Cl.
CPC ......... *G07C 9/00817* (2013.01); *G06F 21/35* (2013.01); *G07C 9/00309* (2013.01);
(Continued)

(58) Field of Classification Search
CPC ............ G07C 9/00817; G07C 9/00309; G07C 2009/00825; G07C 2009/00841; G06F 21/35
(Continued)

(56) References Cited

U.S. PATENT DOCUMENTS 7,320,130 B2 * 1/2008 Hepner ................... G06F 9/524
718/100
8,912,884 B2 * 12/2014 Fisher ...................... G05B 1/00
235/382

(Continued)

FOREIGN PATENT DOCUMENTS

CN 107886600 4/2018

OTHER PUBLICATIONS

Extended Search Report for European Patent Application No. 18166786.6, dated Aug. 6, 2018, 5 pages.
(Continued)

Primary Examiner — Thanh T Le
(74) Attorney, Agent, or Firm — Schwegman Lundberg & Woessner, P.A.

(57) ABSTRACT

It is provided a method for managing administration privileges of an electronic lock. The method is performed in the electronic lock and comprises the steps of: receiving a first signal from a first mobile device, the first signal comprising a first code entered by a user to the first mobile device, and an identifier of the first mobile device; determining that the first mobile device has administration privileges to the electronic lock; storing the first code in memory of the electronic lock; receiving a second signal from a second mobile device, the second signal comprising a second code entered by a user to the second mobile device, and an identifier of the second mobile device; and granting admin-
(Continued)

istration privileges to the lock for the second mobile device only when the second code matches the first code.

17 Claims, 4 Drawing Sheets

(52) U.S. Cl.
CPC ............. *G07C 2009/00825* (2013.01); *G07C 2009/00841* (2013.01)

(58) Field of Classification Search
USPC .......................................................... 726/18
See application file for complete search history.

(56) References Cited

U.S. PATENT DOCUMENTS

| | | | | |
|---|---|---|---|---|
| 9,077,716 | B2* | 7/2015 | Myers | H04L 63/10 |
| 9,491,033 | B1* | 11/2016 | Soyannwo | H04L 67/141 |
| 9,767,630 | B1* | 9/2017 | Kazerani | H04W 4/80 |
| 10,121,026 | B1* | 11/2018 | Ryland | H05K 7/1414 |
| 2005/0055552 | A1* | 3/2005 | Shigeeda | H04L 63/0823 |
| | | | | 713/171 |
| 2008/0034422 | A1* | 2/2008 | Al-Azzawi | G07C 9/00182 |
| | | | | 726/19 |
| 2011/0165869 | A1* | 7/2011 | Guzman | H04W 8/24 |
| | | | | 455/418 |
| 2012/0252405 | A1* | 10/2012 | Lortz | H04W 4/50 |
| | | | | 455/410 |
| 2012/0280783 | A1 | 11/2012 | Gerhardt et al. | |
| 2014/0266586 | A1* | 9/2014 | Fisher | H04W 12/06 |
| | | | | 340/5.61 |
| 2014/0375422 | A1 | 12/2014 | Huber et al. | |
| 2015/0107316 | A1* | 4/2015 | Kirkjan | G07C 9/00309 |
| | | | | 70/275 |
| 2016/0088465 | A1* | 3/2016 | Golla | H04W 8/205 |
| | | | | 455/450 |
| 2017/0140593 | A1* | 5/2017 | Plüss | G07C 9/0069 |
| 2017/0352028 | A1* | 12/2017 | Vridhachalam | |
| | | | | G06Q 20/38215 |
| 2018/0005470 | A1* | 1/2018 | Stephens | G07C 9/29 |
| 2019/0163927 | A1* | 5/2019 | Kochura | G06F 40/151 |
| 2019/0334718 | A1* | 10/2019 | Li | H04L 9/3226 |
| 2019/0371101 | A1* | 12/2019 | Friedli | G07C 9/00571 |

OTHER PUBLICATIONS

International Search Report and Written Opinion for International (PCT) Patent Application No. PCT/EP2019/059144, dated Jun. 27, 2019, 13 pages.
International Preliminary Report on Patentability for International (PCT) Patent Application No. PCT/EP2019/059144, dated Jul. 3, 2020, 7 pages.
"CN 201980024804.6 1st Office Action mailed Jan. 9, 2024", with English translation, 19 pages.

* cited by examiner

MANAGING ADMINISTRATION PRIVILEGES OF AN ELECTRONIC LOCK

CROSS REFERENCE TO RELATED APPLICATION

This application is a national stage application under 35 U.S.C. 371 and claims the benefit of PCT Application No. PCT/EP2019/059144 having an international filing date of Apr. 10, 2019, which designated the United States, which PCT application claimed the benefit of European Patent Application No. 18166786.6 filed Apr. 11, 2018, the disclosure of each of which are incorporated herein by reference.

TECHNICAL FIELD

The invention relates to a method, an electronic lock, a computer program and a computer program product for managing administration privileges of an electronic lock.

BACKGROUND

Locks and keys are evolving from the traditional pure mechanical locks. These days, there are wireless interfaces for electronic locks, e.g. by interacting with a mobile device acting as an electronic key. Such wireless interfaces improve usability while electronic key management is significantly more flexible regarding management of access rights compared to pure mechanical locks.

The electronic lock can be configured to a mobile device having administration privileges. The mobile device with administration privileges can then configure access rights for additional mobile devices, e.g. adding, deleting or editing access rights. However, a situation may occur where the mobile device is lost or stolen. The electronic lock then needs to be reconfigured such that a new mobile device is given administration privileges.

US 2014/0375422 A1 discloses technologies and methods for security access. US 2012/0280783 A1 discloses systems and methods for controlling a locking mechanism using a portable electronic device.

SUMMARY

It is an object to improve how a new mobile device gains administration privileges to an electronic lock.

According to a first aspect, it is provided a method for managing administration privileges of an electronic lock. The method is performed in the electronic lock and comprises the steps of: receiving a first signal from a first mobile device, the first signal comprising a first code entered by a user to the first mobile device, and an identifier of the first mobile device; determining that the first mobile device has administration privileges to the electronic lock; storing the first code in memory of the electronic lock; receiving a second signal from a second mobile device, the second signal comprising a second code entered by a user to the second mobile device, and an identifier of the second mobile device; and granting administration privileges to the lock for the second mobile device only when the second code matches the first code.

The step of determining that the first mobile device has administration privileges may comprise reading an indication from local storage that the first mobile device has administration privileges.

The step of granting administration privileges may comprise storing, when administration privileges are granted, an indication in local storage that the second mobile device has administration privileges.

The method may further comprise the step of: removing administration privileges to the lock for the first mobile device when administration privileges to the lock have been granted for the second mobile device.

The method may further comprise the steps of: transmitting a first dataset to the second mobile device; receiving a second dataset from the second mobile device; and determining when the second dataset comprises a verification electronic signature of the first dataset, the verification electronic signature being applied by a server for an electronics access control system to which the electronic lock is associated. In such a case, the step of granting administration privileges comprises granting administration privileges only when the second dataset comprises the verification electronic signature.

The first signal may comprise a code electronic signature of the first code, in which case the step of storing the first code is only performed when the code electronic signature is verified to be applied by the server for the electronics access control system to which the electronic lock is associated.

The step of determining that the first mobile device has administration privileges may be based on there being no other mobile device configured to have administration privileges to the electronic lock.

The administration privileges are required for the electronic lock device to allow a mobile device to configure access rights for additional mobile devices.

According to a second aspect, it is provided an electronic lock configured to manage its administration privileges. The electronic lock comprises: a processor; and a memory storing instructions that, when executed by the processor, cause the electronic lock to: receive a first signal from a first mobile device, the first signal comprising a first code entered by a user to the first mobile device, and an identifier of the first mobile device; determine that the first mobile device has administration privileges to the electronic lock; store the first code in memory of the electronic lock; receive a second signal from a second mobile device, the second signal comprising a second code entered by a user to the second mobile device, and an identifier of the second mobile device; and grant administration privileges to the lock for the second mobile device only when the second code matches the first code.

The instructions to determine that the first mobile device has administration privileges comprise instructions that, when executed by the processor, cause the electronic lock to read an indication from local storage that the first mobile device has administration privileges.

The instructions to grant administration privileges comprise instructions that, when executed by the processor, cause the electronic lock to store, when administration privileges are granted, an indication in local storage that the second mobile device has administration privileges.

The electronic lock may further comprise instructions that, when executed by the processor, cause the electronic lock to: remove administration privileges to the lock for the first mobile device when administration privileges to the lock have been granted for the second mobile device.

The electronic lock may further comprise instructions that, when executed by the processor, cause the electronic lock to: transmit a first dataset to the second mobile device; receive a second dataset from the second mobile device; and determine when the second dataset comprises a verification electronic signature of the first dataset, the verification electronic signature being applied by a server for an electronics access control system to which the electronic lock is associated. In such a case, the instructions to grant administration privileges comprise instructions that, when executed by the processor, cause the electronic lock to grant administration privileges only when the second dataset comprises the verification electronic signature.

The first signal may comprise a code electronic signature of the first code, in which case the instructions to store the first code are only executed when the code electronic signature is verified to be applied by the server for the electronics access control system to which the electronic lock is associated.

The step of determining that the first mobile device has administration privileges may be based on there being no other mobile device configured to have administration privileges to the electronic lock.

The electronic lock may be configured to require the administration privileges for a mobile device to allow configuration, by the mobile device, of access rights for additional mobile devices.

According to a third aspect, it is provided a computer program for managing administration privileges of an electronic lock. The computer program comprises computer program code which, when run on an electronic lock, causes the electronic lock to: receive a first signal from a first mobile device, the first signal comprising a first code entered by a user to the first mobile device, and an identifier of the first mobile device; determine that the first mobile device has administration privileges to the electronic lock; store the first code in memory of the electronic lock; receive a second signal from a second mobile device, the second signal comprising a second code entered by a user to the second mobile device, and an identifier of the second mobile device; and grant administration privileges to the lock for the second mobile device only when the second code matches the first code.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
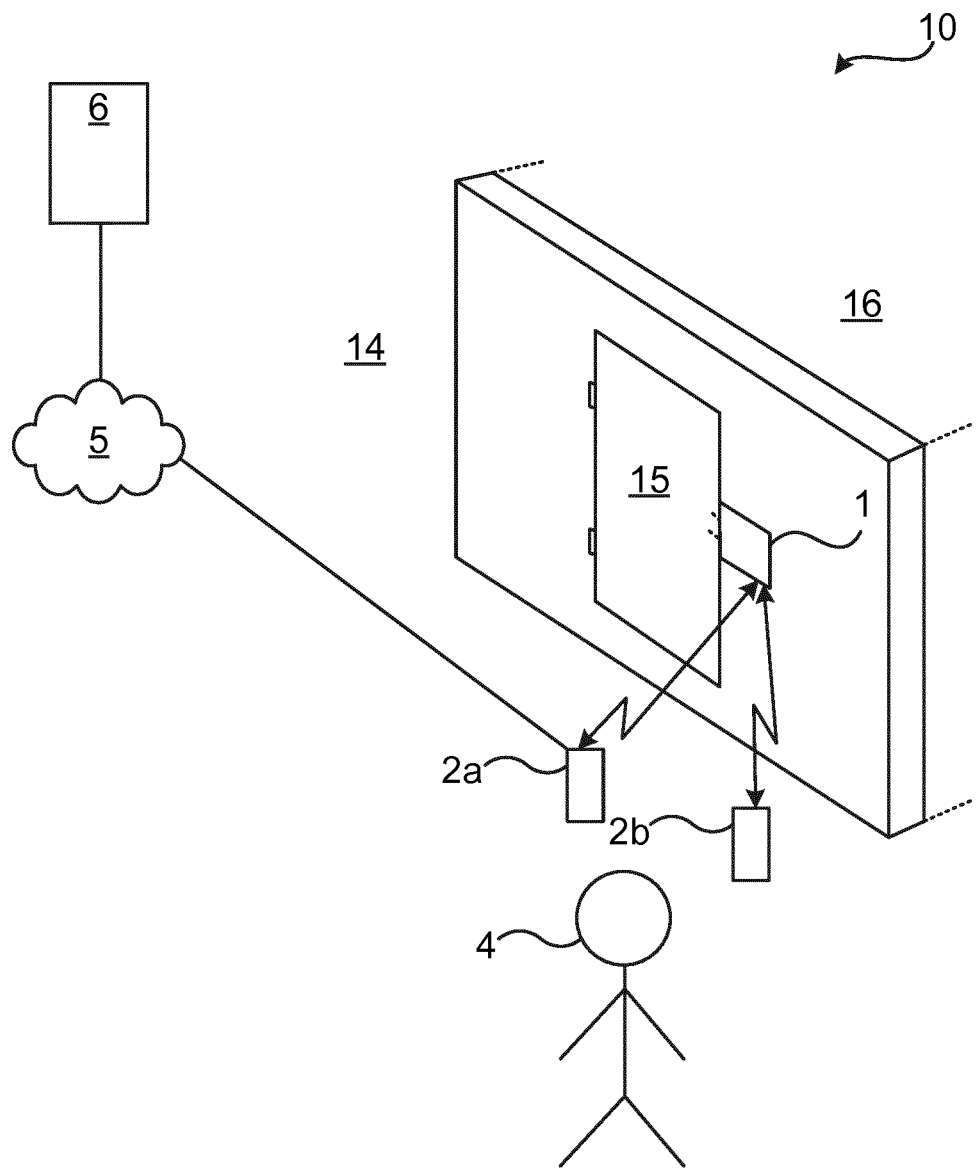
FIG. 1 is a schematic diagram showing an electronics access control system being an environment in which embodiments presented herein can be applied.

FIG. 1 is a schematic diagram showing an electronics access control system 10 being an environment in which embodiments presented herein can be applied. Access to a physical space 16 is restricted by a physical barrier 15, which is selectively unlockable. The physical barrier 15 stands between the restricted physical space 16 and an accessible physical space 14. Note that the accessible physical space 14 can be a restricted physical space in itself, but in relation to this particular physical barrier 15, the accessible physical space 14 is accessible. The barrier 15 can be a door, gate, hatch, window, drawer, lockable packaging, etc. In order to unlock the barrier 15, an electronic lock 1 is provided. The electronic lock 1 can be in an unlocked state or locked state. The barrier 15 is provided in a surrounding fixed structure, such as a wall or fence.

The electronic lock 1 is able to receive and send signals from/to mobile devices 2a-b over a communication channel which may be a short-range wireless interface or a conductive (i.e. galvanic/electric) connection. In this example, there is a first mobile device 2a and a second mobile device 2b. The mobile devices 2a-b do not need to be by the electronic lock 1 at the same time. As described later, a user first uses the first mobile device 2a. When the first mobile device 2a is lost by the user 4, the second mobile device 2b is used to regain control over the electronic lock 1. The mobile devices 2a-b are implemented using any suitable device which is portable by a user 4 and which can be used for authentication over the communication channel. The mobile device 2a-b is typically carried or worn by a user and may be implemented as a smart phone, wearable device, etc. The mobile device 2a-b includes a code input device, such as a touch sensitive display or a keypad.

The short-range wireless interface between the mobile devices 2a-b and the electronic lock 1 is a radio frequency wireless interface and could e.g. employ Bluetooth, Bluetooth Low Energy (BLE), ZigBee, Radio Frequency Identification (RFID), any of the IEEE 802.11 standards, any of the IEEE 802.15 standards, wireless Universal Serial Bus (USB), etc. The mobile devices 2a-b can also be considered to be credentials. Using the communication channel, the identity of the mobile devices 2a-b can be obtained. Moreover, the authenticity of the identity of the mobile device 2a-b can be checked. In any case, the electronic lock 1 communicates with the mobile devices 2a-b and evaluates whether to grant or deny access.

When access is granted, the electronic lock 1 is set in an unlocked state. When the electronic lock 1 is in the unlocked state, the barrier 15 can be opened and when the electronic lock 1 is in a locked state, the barrier 15 cannot be opened. In this way, access to a closed space 16 is controlled by the electronic lock 1. It is to be noted that the electronic lock 1 can be mounted in the fixed structure by the physical barrier 15 (as shown) or in the physical barrier 15 itself (not shown).

The mobile devices 2a-b contain communication capabilities to connect to a server 6 for the electronics access control system 10 via a network 5. The network can be a wide area network, such as the Internet, to which the mobile devices 2a-b can connect e.g. via WiFi (e.g. any of the IEEE 802.11x standards) or a cellular network, e.g. LTE (Long Term Evolution), next generation mobile networks (fifth generation, 5G), UMTS (Universal Mobile Telecommunications System) utilising W-CDMA (Wideband Code Division Multiplex), etc.

Figure 2:
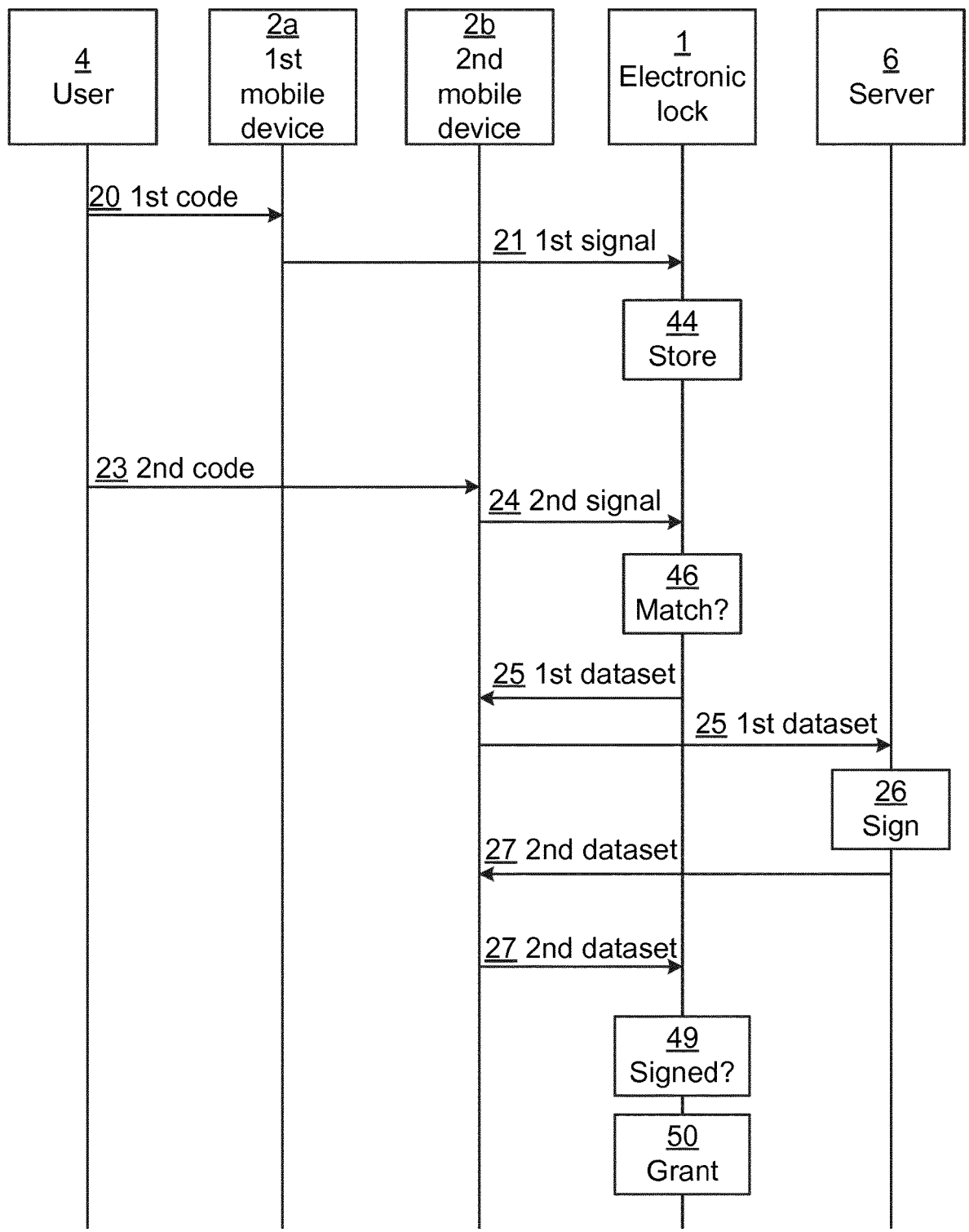
FIG. 2 is a sequence diagram illustrating communication between different entities of FIG. 1 for managing administration privileges of the electronic lock.

FIG. 2 is a sequence diagram illustrating communication between different entities of FIG. 1 for managing administration privileges of the electronic lock.

At first, the user 4 inputs a first code 20 to the first mobile device 2a, e.g. using a touch screen or keypad of the first mobile device 2a. The first mobile device 2a sends a first signal 21 to the electronic lock 1, where the first signal 21 contains the first code. The electronic lock 1 determines that the first mobile device 2a is allowed to administer the electronic lock 1, e.g. when no other device is registered with administration privileges, or that the first mobile device 2a is registered (in local storage of the electronic lock 1) to have administration privileges, and stores 44 the first code of the first signal 21.

If the user 4 loses the first mobile device 2a or the first mobile device 2a gets stolen, the user 4 needs to regain administration privileges of the electronic lock 1, but for a new, second mobile device 2b. In order to regain control, the user enters a second code 23, now into the second mobile device 2b. The second mobile device 2b sends a second signal 24 to the electronic lock 1, where the second signal 24 contains the second code. The electronic lock 1 compares the second code of the second signal 24 with the first code stored in memory. If there is a match, the sequence proceeds, otherwise the sequence ends.

In one embodiment, the code comparison is sufficient to determine that the second device should be granted 50 administration privileges.

In one embodiment, further steps are performed to enhance security. The electronic lock 1 then sends a first dataset 25 to the second mobile device 2b. The first dataset can be any sequence of bits.

The second mobile device 2b ensures that it is logged on the server 6, or prompts the user to log on to the server 4. Once the second mobile device 2b is logged on to the server, the first dataset 25 is forwarded to the server 6 for signing. At this stage, the server 6 verifies that the second mobile device 2b is validly logged on to the server 6 (which can be implicitly verified by only accepting such messages from mobile devices that are logged on), and if this is the case, electronically signs 26 the first dataset, using a private key of a cryptographic key pair for the server. The server transmits a second dataset 27, which contains the electronic signature of the first dataset, to the second mobile device 2b. The second mobile device 2b forwards the second dataset 27 to the electronic lock 1.

The electronic lock 1 has the public key of the cryptographic key pair of the server stored in memory. In this way, the electronic lock 1 can verify if the electronic signature of the second dataset 27 indeed is a valid signature of the first dataset by the server 6. If the signature is valid, this indicates that the user of the second mobile device is logged on to the server, which gives an extra layer of security. When the electronic signature is checked, administration privileges are granted 50 if the electronic signature is valid.

Figure 3:
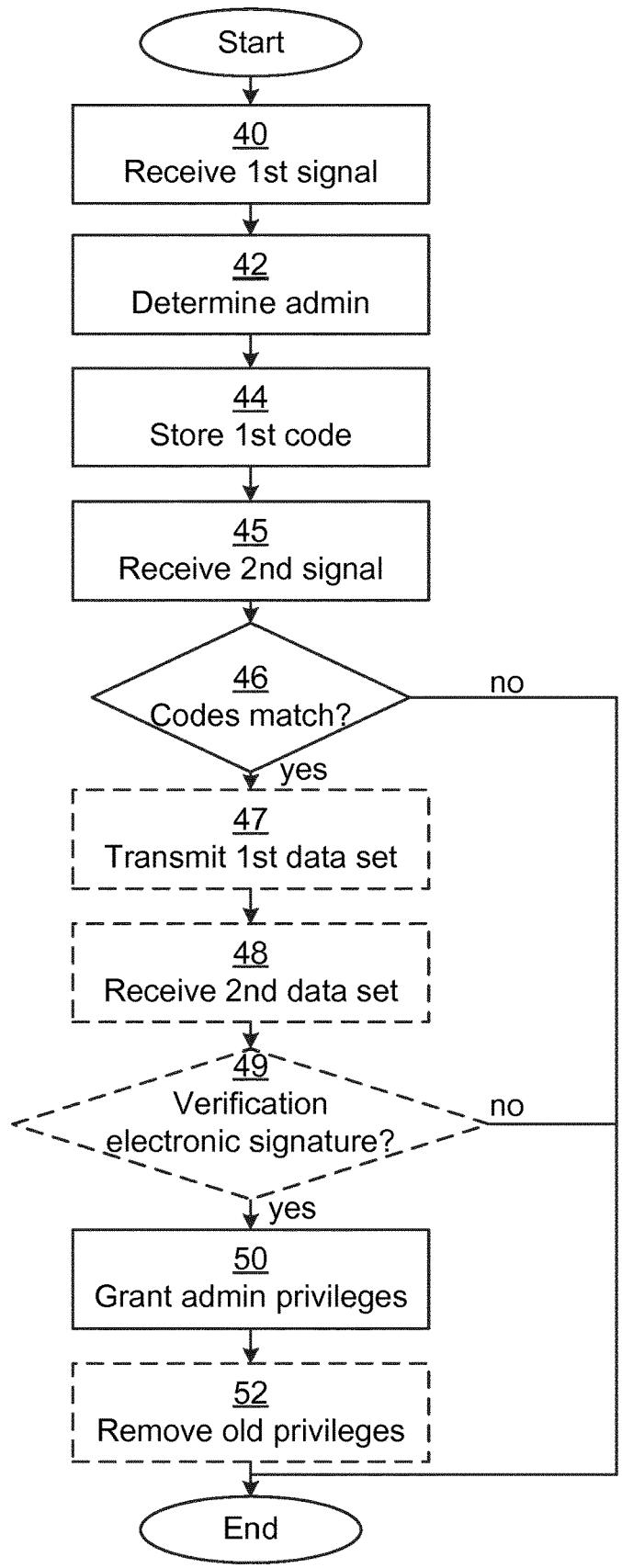
FIG. 3 is a flow chart illustrating embodiments of methods for managing administration privileges of an electronic lock.

FIG. 3 is a flow chart illustrating embodiments of methods for managing administration privileges of an electronic lock. The method is performed in the electronic lock. The method corresponds to the actions of the electronic lock of FIG. 2. Administration privileges can e.g. be to be registered as an owner of the lock, allowing any configuration of the lock to be performed, e.g. to add/remove/edit access rights for other key devices, etc. In other words, the administration privileges can be required for the electronic lock device to allow a mobile device to configure access rights for additional mobile devices. When administration privileges are not registered for a mobile device, the mobile device is not allowed to configure access rights for additional mobile devices, or indeed, itself.

In a receive $1^{st}$ signal step 40, the electronic lock receives a first signal from a first mobile device. The first signal comprises a first code entered by a user to the first mobile device. The code can e.g. be a numerical sequence of digits, such as an eight-digit PIN (Personal Identification Number) code, a PIN of other length or an alphanumeric code. The first signal further comprises an identifier of the first mobile device. The identifier can be any data item allowing the first mobile device to be identified, e.g. an alphanumeric sequence or numeric sequence.

In a determine admin step 42, the electronic lock determines that the first mobile device has administration privileges to the electronic lock. For instance, this can be based on there being no other mobile device configured to have administration privileges to the electronic lock. Such a situation would exist if the electronic lock has just been installed and is yet unconfigured with regard to access rights. Alternatively or additionally, the electronic lock has stored that the first mobile device has administration privileges.

The determination of administration privileges can be based on reading an indication from local storage that the first mobile device has administration privileges. The local storage (see e.g. data memory 65 of FIG. 4) then contains one or more entries of mobile device identifiers which are allowed administration privileges.

In a store $1^{st}$ code step 44, the electronic lock stores the first code in memory of the electronic lock. 4. This step is conditional on the first mobile device having administration privileges to the electronic lock. Optionally, the first signal comprises a code electronic signature of the first code. The code electronic signature is an electronic signature which has been applied to verify that the first mobile device is signed in to the server. In such a case, the electronic lock verifies to see if the code electronic signature is has been applied by the server for the electronics access control system to which the electronic lock is associated, e.g. using a public key of the server. When this is verified, this indicates that the first mobile device is signed in to the server, which adds an assurance that a valid user of the system uses the first device.

In a receive $2^{nd}$ signal step 45, the electronic lock receives a second signal from a second mobile device. This step can be performed long after the previous step, when the user has lost his/her first mobile device and wishes to regain control over the electronic lock using a second mobile device. The second signal comprises a second code entered by a user to the second mobile device. The second signal further comprises an identifier of the second mobile device.

The second mobile device can also have collected a public key of the electronic lock from a backend or another source. As part of the connection with the electronic lock, the second mobile device verifies that the electronic lock has the corresponding private key. Optionally, the second signal is encrypted with the public key of the electronic lock. In this way, the second signal, comprising the second code, can only be decrypted by the owner of the corresponding private key, i.e. only by the legitimate electronic lock. This prevents a man in the middle attack, where a separate device would pose as the electronic lock and put itself between the electronic lock and the second device and thereby intercept the second code.

In a conditional codes match step 46, the electronic lock determines whether the first code matches the second code, i.e. if the first code and the second code are identical. If this is the case, the method proceeds to an optional transmit $1^{st}$ dataset step 47 or a grant admin privileges step 50. Otherwise, the method ends.

In an optional transmit $1^{st}$ dataset step 47, the electronic lock transmits a first dataset to the second mobile device. The first dataset can be any suitable set of data, e.g. binary data or a string. The first dataset is sent to the electronic lock for forwarding to the server for signing.

In an optional receive $2^{nd}$ dataset step 48, the electronic lock receives a second dataset from the second mobile device. The second dataset is used to verify if it contains a valid signature by the server of the first data dataset.

In an optional conditional verification electronic signature step 49, the electronic lock determining when the second dataset comprises a verification electronic signature of the first dataset. The electronic lock then verifies that the verification electronic signature has been applied by a server for an electronics access control system to which the electronic lock is associated. The verification can be based on a public key of the server, which is stored in memory of the electronic lock. If the verification is positive, the method proceeds to the grant admin privileges step 50. Otherwise, the method ends.

In a grant admin privileges step 50, the electronic lock grants administration privileges to the lock for the second mobile device. This comprises storing in memory that the second mobile device has administration privileges.

This step can include storing, when administration privileges are granted, an indication in local storage (e.g. data memory 65 of FIG. 4) that the second mobile device has administration privileges.

In an optional remove old privileges step 52, the electronic lock removes administration privileges to the lock for the first mobile device. In this way, the first mobile device is prevented from administering the electronic lock, e.g. if the first mobile device has been lost/stolen and an attacker attempts to gain access to the electronic lock using the first mobile device. In this case, the electronic lock can be configured to only have one mobile device which is registered (in its local storage) to have administration privileges.

Optionally, any access rights for the first mobile device are also removed from the electronic lock.

Using embodiments of the method presented herein, a user can securely regain control of the electronic lock if a mobile device for configuring the lock is lost or stolen. Moreover, the electronic lock does not need to have network access for this procedure to work. Additionally, there is no need to have physical access to an internal part of the lock, e.g. to reach a reset button or similar.

Figure 4:
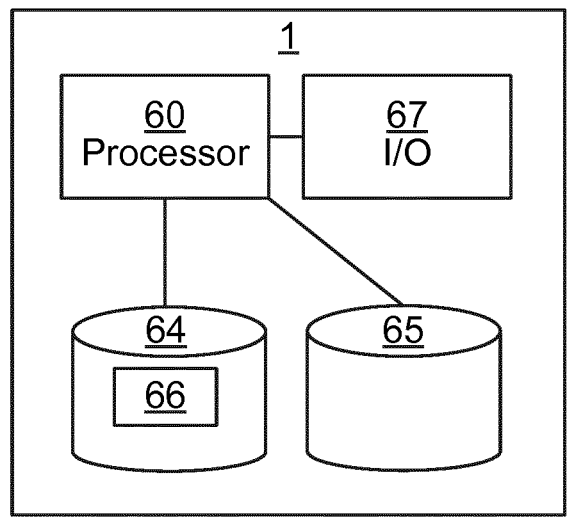
FIG. 4 is a schematic diagram showing some components of the electronic lock 1 of FIG. 1.

FIG. 4 is a schematic diagram showing some components of the electronic lock 1 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 is a local memory which is provided for reading and/or storing data during execution of software instructions in the processor 6o. The data memory 65 can be any combination of random-access memory (RAM) and read-only memory (ROM) which may be persistent and/or volatile memory. The data memory 65 can store the first code as described above. The first code can be stored in a persistent part of the data memory 65, e.g. in a flash memory. The data memory 65 can also store in a persistent part of the data memory 65 (e.g. in a flash memory) indications of one or more mobile devices that are to be allowed administration privileges.

The electronic lock 1 further comprises an I/O interface 67 for communicating with other external entities such as the mobile devices 2a-b. The I/O interface 67 can support wireless communication, e.g. using Bluetooth, BLE, ZigBee, RFID, and/or any of the IEEE 802.11 standards, any of the IEEE 802.15 standards, wireless USB, etc., e.g. for communication with the mobile devices 2a-b.

Other components of the electronic lock 1 are omitted in order not to obscure the concepts presented herein.

Figure 5:
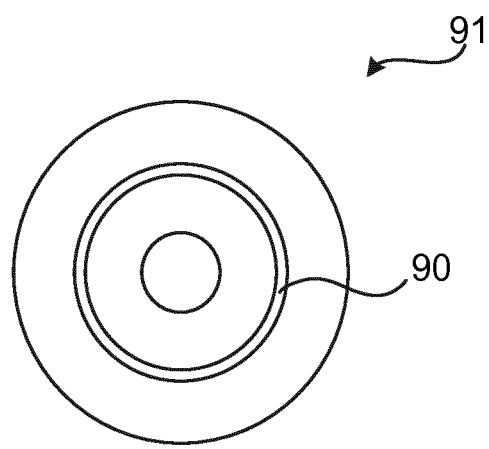
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4.

While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for managing administration privileges of an electronic lock (1), the method being performed in the electronic lock (1) and comprising the steps of:

receiving (40) a first signal from a first mobile device (2a), the first signal comprising a first code entered by a user (4) to the first mobile device, and an identifier of the first mobile device (2a);

determining (42) that the first mobile device (2a) has administration privileges to the electronic lock;

storing (44) the first code in memory (65) of the electronic lock (1);

receiving (45) a second signal from a second mobile device (2b), the second signal comprising a second code entered by a user (4) to the second mobile device, and an identifier of the second mobile device; and granting (50) administration privileges to the lock for the second mobile device only when the second code matches the first code.

ii. The method according to embodiment i, further comprising the step of:
removing (52) administration privileges to the lock for the first mobile device when administration privileges to the lock have been granted for the second mobile device.
iii. The method according to embodiment i or ii, further comprising the steps of:
transmitting (47) a first dataset to the second mobile device;
receiving (48) a second dataset from the second mobile device; and
determining (49) when the second dataset comprises a verification electronic signature of the first dataset, the verification electronic signature being applied by a server for an electronics access control system to which the electronic lock is associated; and
wherein the step of granting (50) administration privileges comprises granting administration privileges only when the second dataset comprises the verification electronic signature.
iv. The method according to any one of the preceding embodiments, wherein the first signal comprises a code electronic signature of the first code;
and wherein the step of storing (44) the first code is only performed when the code electronic signature is verified to be applied by the server for the electronics access control system to which the electronic lock is associated.
v. The method according to any one of the preceding embodiments, wherein the step of determining that the first mobile device has administration privileges is based on there being no other mobile device configured to have administration privileges to the electronic lock.
vi. An electronic lock (1) configured to manage its administration privileges, the electronic lock (1) comprising:
a processor (60); and
a memory (64) storing instructions (67) that, when executed by the processor, cause the electronic lock (1) to:
receive a first signal from a first mobile device, the first signal comprising a first code entered by a user to the first mobile device, and an identifier of the first mobile device;
determine that the first mobile device has administration privileges to the electronic lock;
store the first code in memory of the electronic lock;
receive a second signal from a second mobile device, the second signal comprising a second code entered by a user to the second mobile device, and an identifier of the second mobile device; and
grant administration privileges to the lock for the second mobile device only when the second code matches the first code.
vii. The electronic lock (1) according to embodiment vi, further comprising instructions (67) that, when executed by the processor, cause the electronic lock (1) to:
remove administration privileges to the lock for the first mobile device when administration privileges to the lock have been granted for the second mobile device.
viii. The electronic lock (1) according to embodiment vi or vii, further comprising instructions (67) that, when executed by the processor, cause the electronic lock (1) to:
transmit a first dataset to the second mobile device;
receive a second dataset from the second mobile device; and
determine when the second dataset comprises a verification electronic signature of the first dataset, the verification electronic signature being applied by a server for an electronics access control system to which the electronic lock is associated; and
wherein the instructions to grant administration privileges comprise instructions (67) that, when executed by the processor, cause the electronic lock (1) to grant administration privileges only when the second dataset comprises the verification electronic signature.
ix. The electronic lock (1) according to any one of embodiments vi to viii, wherein the first signal comprises a code electronic signature of the first code;
and wherein the instructions to store the first code are only executed when the code electronic signature is verified to be applied by the server for the electronics access control system to which the electronic lock is associated.
x. The electronic lock (1) according to any one of embodiments vi to ix, wherein the step of determining that the first mobile device has administration privileges is based on there being no other mobile device configured to have administration privileges to the electronic lock.
xi. A computer program (67, 91) for managing administration privileges of an electronic lock (1), the computer program comprising computer program code which, when run on an electronic lock (1), causes the electronic lock (1) to: receive a first signal from a first mobile device, the first signal comprising a first code entered by a user to the first mobile device, and an identifier of the first mobile device;
determine that the first mobile device has administration privileges to the electronic lock;
store the first code in memory of the electronic lock;
receive a second signal from a second mobile device, the second signal comprising a second code entered by a user to the second mobile device, and an identifier of the second mobile device; and
grant administration privileges to the lock for the second mobile device only when the second code matches the first code.
xii. A computer program product (64, 90) comprising a computer program according to embodiment xi and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method for managing administration privileges of an electronic lock, the method being performed in the electronic lock and comprising:
receiving a first signal from a first mobile device, the first signal comprising a first code entered by a user to the first mobile device, and an identifier of the first mobile device;
determining that the first mobile device has administration privileges to the electronic lock, such that the first mobile device has a right to configure access rights for additional mobile devices;

storing the first code from the first signal in persistent memory of the electronic lock;
receiving a second signal from a second mobile device, the second signal comprising a second code entered by a user to the second mobile device, and an identifier of the second mobile device; and
granting administration privileges to the lock for the second mobile device only when the second code matches the first code.

2. The method according to claim 1, wherein determining that the first mobile device has administration privileges comprises reading an indication from local storage that the first mobile device has administration privileges.

3. The method according to claim 1, wherein granting administration privileges comprises storing, when administration privileges are granted, an indication in local storage that the second mobile device has administration privileges.

4. The method according to claim 1, further comprising:
removing administration privileges to the lock for the first mobile device when administration privileges to the lock have been granted for the second mobile device.

5. The method according to claim 1, further comprising:
transmitting a first dataset to the second mobile device;
receiving a second dataset from the second mobile device; and
determining when the second dataset comprises a verification electronic signature of the first dataset, the verification electronic signature being applied by a server for an electronics access control system to which the electronic lock is associated;
wherein granting administration privileges comprises granting administration privileges only when the second dataset comprises the verification electronic signature.

6. The method according to claim 5, wherein:
the first signal comprises a code electronic signature of the first code; and
storing the first code is only performed when the code electronic signature is verified to be applied by the server for the electronics access control system to which the electronic lock is associated.

7. The method according to claim 1, wherein determining that the first mobile device has administration privileges is based on there being no other mobile device configured to have administration privileges to the electronic lock.

8. The method according to claim 1, wherein the administration privileges are required for the electronic lock device to allow a mobile device to configure access rights for additional mobile devices.

9. An electronic lock configured to manage its administration privileges, the electronic lock comprising:
a processor; and
a memory storing instructions that, when executed by the processor, cause the electronic lock to:
receive a first signal from a first mobile device, the first signal comprising a first code entered by a user to the first mobile device, and an identifier of the first mobile device;
determine that the first mobile device has administration privileges to the electronic lock;
store the first code from the first signal in persistent memory of the electronic lock, such that the first mobile device has a right to configure access rights for additional mobile devices;
receive a second signal from a second mobile device, the second signal comprising a second code entered by a user to the second mobile device, and an identifier of the second mobile device; and
grant administration privileges to the lock for the second mobile device only when the second code matches the first code.

10. The electronic lock according to claim 9, wherein the instructions to determine that the first mobile device has administration privileges comprise instructions that, when executed by the processor, cause the electronic lock to read an indication from local storage that the first mobile device has administration privileges.

11. The electronic lock according to claim 9, wherein the instructions to grant administration privileges comprise instructions that, when executed by the processor, cause the electronic lock to store, when administration privileges are granted, an indication in local storage that the second mobile device has administration privileges.

12. The electronic lock according to claim 9, further comprising instructions that, when executed by the processor, cause the electronic lock to:
remove administration privileges to the lock for the first mobile device when administration privileges to the lock have been granted for the second mobile device.

13. The electronic lock according to claim 9, further comprising instructions that, when executed by the processor, cause the electronic lock to:
transmit a first dataset to the second mobile device;
receive a second dataset from the second mobile device; and
determine when the second dataset comprises a verification electronic signature of the first dataset, the verification electronic signature being applied by a server for an electronics access control system to which the electronic lock is associated;
wherein the instructions to grant administration privileges comprise instructions that, when executed by the processor, cause the electronic lock to grant administration privileges only when the second dataset comprises the verification electronic signature.

14. The electronic lock according to claim 13, wherein:
the first signal comprises a code electronic signature of the first code; and
the instructions to store the first code are only executed when the code electronic signature is verified to be applied by the server for the electronics access control system to which the electronic lock is associated.

15. The electronic lock according to claim 9, wherein determining that the first mobile device has administration privileges is based on there being no other mobile device configured to have administration privileges to the electronic lock.

16. The electronic lock according to claim 9 wherein the electronic lock is configured to require the administration privileges for a mobile device to allow configuration, by the mobile device, of access rights for additional mobile devices.

17. A non-transitory computer readable medium storing a computer program for managing administration privileges of an electronic lock, the computer program comprising computer program code which, when run on an electronic lock, causes the electronic lock to:
receive a first signal from a first mobile device, the first signal comprising a first code entered by a user to the first mobile device, and an identifier of the first mobile device;
determine that the first mobile device has administration privileges to the electronic lock;

store the first code from the first signal in persistent memory of the electronic lock, such that the first mobile device has a right to configure access rights for additional mobile devices;

receive a second signal from a second mobile device, the second signal comprising a second code entered by a user to the second mobile device, and an identifier of the second mobile device; and grant administration privileges to the lock for the second mobile device only when the second code matches the first code.

\* \* \* \* \*